May 20, 1952  G. L. HAMMON  2,597,479
REGULATOR ADJUSTING MECHANISM
Filed March 11, 1947
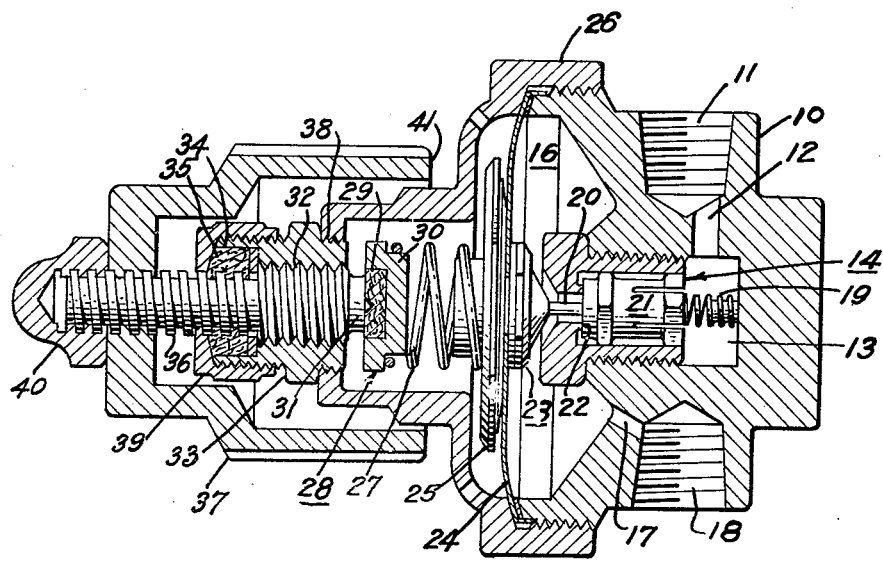
INVENTOR.
GEORGE L. HAMMON
BY
ATTORNEY.

UNITED STATES PATENT OFFICE 2,597,479

REGULATOR ADJUSTING MECHANISM

George L. Hammon, Berkeley, Calif., assignor to National Welding Equipment Co., San Francisco, Calif., a corporation of California Application March 11, 1947, Serial No. 733,927

3 Claims. (Cl. 50—23)

This invention relates to improvements in valve stem packings and regulators.

It has use particularly in regulators of the type used to reduce the pressure of a gas from some high-pressure source and has particular reference to the adjusting mechanism of the regulator.

One object of this invention is to provide a regulator adjusting mechanism having no "metallic feel" during its operation.

Another object of the invention is to provide an adjusting mechanism which will have an exceptionally long life and require infrequent repair or replacement.

Other objects and advantages of the invention will appear from the following description.

In the drawings:

Fig. 1 is a side view, mostly in section, of a regulator embodying this invention.

In valves of this type the pressures are so great that a slight turn on the handle will have a large effect. Also, due to the high pressures, the parts must be kept tight and yet they should be easily turned in making adjustments.

The gas enters the housing body 10 of the regulator at the inlet opening 11 and passes through the conduit 12 into the high-pressure chamber 13. A valve mechanism 14, preferably of the type shown in my co-pending application Serial No. 733,924, filed March 11, 1947, permits the gas to enter the pressure expansion chamber 16, where the pressure is reduced to the desired amount. Then the gas flows out through the conduit 17 to the outlet opening 18.

The valve 14, normally urged to a closed position by the spring 19, is opened when the actuating pin 20 pushes the valve piston 21 away from the valve seat 22. The actuating pin 20 is carried on the end of the diaphragm mount 23, which also supports the diaphragm 24 and the diaphragm plate 25. The entire diaphragm assembly is held in place by threading the housing head 26 onto complementary threads on the housing base 10, and the diaphragm 24 then forms the top of the expansion chamber 16. The diaphragm 24 maintains the outlet pressure at 18 at a substantially even rate because an increase in pressure within the chamber 16 causes the diaphragm to exert a force tending to move the pin 20 to the left and thus to reduce the flow of gas around the valve 14, while a decrease in pressure has the effect of permitting the spring 27 to move the diaphragm and the pin 20 to the right.

This invention has to do primarily with the means for adjusting the spring 27 which bears at one end on a boss on the diaphragm plate 25 and bears at its opposite end on a bearing member 28. This bearing member 28 has a non-metallic insert, preferably consisting of a leather disc 29, supported in a socket 30. The disc 29 preferably should be larger than the end 31 of the adjusting screw which bears against it. It can best be of a non-metallic material such as rubber, leather, composition, or other equivalent material. The "feel" imparted by this arrangement is noticeably different from the abrasive, metal rubbing on metal feel in other forms of high pressure valve regulators. The adjusting screw 32 through which this feel is imparted is mounted on the screw housing 33, which is, in turn, threaded into the housing head 26 at 38. The screw housing 33 has a recess 34 at one end which is filled with the packing material 35, preferably a composition of asbestos, lead wire, copper wire, and a vegetable oil. This packing lubricates the threads 36 of the screw 32, which threads are preferably square. A compression nut 39 holds the packing 35 in snug leak-tight contact on the threads 36.

The adjusting mechanism is completed by the handle 37 which is mounted on the screw 32, and is used to turn it. A lock nut 40 holds the handle nut 37 in place. It is preferable that the rim 41 of the handle should seat on the housing head 26 at a certain pressure thereby producing in effect a perfect seal for the exposed part of the screw. It serves to seal out the dust and dirt from getting onto the threads at 36 or inside to the V threads on 32 and causing wear and leakage. This feature is more completely described in my co-pending application Serial No. 733,928, filed March 11, 1947, now abandoned.

One source of annoyance in regulator mechanisms has been metallic feel due to the metal on metal contacts of the screw with the spring or metal bearing on the spring. The combination described herein has a surprising and pleasing effect in the operation of the device. The metal-against-leather contact of the screw end 31 with the leather bearing 29 avoids a metallic feel and at the same time provides a longer wearing connection than has been provided heretofore.

It is to be understood that I have described a preferred example of my invention, and that various changes may be made in the shape, size, material, and arrangement of the parts without departing from the spirit of my invention or the scope of the claims.

I claim:

1. A pressure regulating gas valve comprising a diaphragm, an adjusting screw, and spring means between said screw and said diaphragm for regulating the entry of gas, a bearing rigid member on the end of said spring and a member of non-metallic material having leather-like qualities supported thereon and engaged by the end of said adjusting screw.

2. A pressure regulating gas valve comprising a diaphragm, an adjusting screw, and spring means between said screw and said diaphragm for regulating the entry of gas, a recessed rigid bearing supporting member on the end of said spring, and a leather disc in said recess engaged by the end of said adjusting screw.

3. A gas pressure regulator comprising a housing, a high-pressure chamber in said housing, an expansion chamber in said housing, and a valve in said housing between said high-pressure chamber and said expansion chamber, an actuating pin adapted to be moved to open said valve, a coil spring operatively connected to exert forces on said pin and move it, a screw mounted in said housing by which the tension of said spring can be varied, a diaphragm acted upon by the compression in said expansion chamber to regulate the movement of said pin, a recessed rigid bearing supporting member between said spring and said screw, and a leather-like bearing in the recess in contact with said screw.

GEORGE L. HAMMON.

REFERENCES CITED

The following references are of record in the file of this patent:

UNITED STATES PATENTS

| Number | Name | Date |
|---|---|---|
| 2,005,445 | Wiedhofft | June 18, 1935 |
| 2,212,997 | Blanchard | Aug. 27, 1940 |
| 2,252,789 | Van Dorn | Aug. 19, 1941 |